March 25, 1958 W. P. EWALD 2,827,821
STEREO CLOSE UP ATTACHMENT
Filed Oct. 24, 1955

WILLIAM P. EWALD
INVENTOR.

BY Daniel I. Mayne
J. Griffin Little
ATTORNEYS

United States Patent Office 2,827,821
Patented Mar. 25, 1958

2,827,821

STEREO CLOSE UP ATTACHMENT

William P. Ewald, Rochester, N. Y., assignor to Eastman Kodak Company, Rochester, N. Y., a corporation of New Jersey Application October 24, 1955, Serial No. 542,164

6 Claims. (Cl. 88—1.5)

The present invention relates to photography, and more particularly to a close up attachment for use with a stereo camera.

Unlike an ordinary photograph, a stereo photograph or transparency, is framed by a window located in a specific spatial plane usually in front of the subject being photographed. There are numerous methods of producing this window, and several factors influencing its location. The ideal way would be to have the lenses moved toward each other, but this is not practical from a manufacturing standpoint. Most commonly, a window is supplied by the relative positions of the ready mount apertures with respect to the stereo images. Initially, the images are exposed upon the film so as to produce a window at approximately 7 feet (if the unexposed area around the transparency supplies the frame). In mounting, the cardboard window is displaced inward with respect to the exposed border to the extent of locating the apparent window approximately 4½ feet. All the stereo slides which are mounted in the conventional manner will, therefore, locate the window at 4½ feet. This, of course, makes table top in stereo unsatisfactory.

The attachment of the present invention supplements the stereo camera, and permits predetermination of the window location by stereo photography. Also, the present invention provides a device which corrects for distortion exhibited in stereo close-ups.

The present invention has as its principal object the provision of an attachment which permits close-up stereo photography.

A further object of the invention is the provision of such an attachment which can be applied readily to a stereo camera.

Yet another object of the invention is the provision of such an attachment which is simple in structure, rugged, relatively inexpensive to manufacture and highly effective in use.

Still another object of the invention is the provision of a new and simple device which corrects for distortion exhibited by a stereo close-up.

To these and other ends the invention resides in certain improvements and combinations of parts, all as will be hereinafter more fully described, the novel features being pointed out in the claims at the end of the specification.

In the drawings.

Similar reference numerals throughout the various views indicate the same parts.

Figure 1:
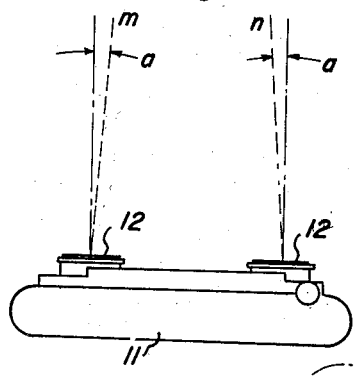
Fig. 1 is a plan view of a stereo camera showing the toe-in which results from the lens shift and mounting shift.
Figure 2:
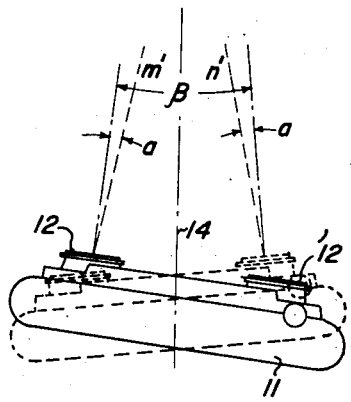
Fig. 2 is a view similar to Fig. 1 showing the camera positioned for successive stereo exposures.

Figs. 1 and 2 show a stereo camera 11 having a pair of laterally spacing taking or exposing lenses 12. A viewfinder, broadly designated by the numeral 13, is positioned between the lenses 12, as clearly illustrated in Fig. 3. As the camera with its viewfinder forms no part of the present invention, details thereof are not shown or described. Accordingly, this camera is shown merely for illustrative purposes only and is not intended to be a limitation.

As is well known, the lenses of a stereo camera are toed-in so as to position the window at the intersection of lines $m$ and $n$. As will be apparent from an inspection of Fig. 2, the intersection of lines $m'$ and $n'$, and hence the window, may be positioned at any point along line 14 by varying the angle of the camera lenses. The exact position of the point of intersection of $m'$ and $n'$, and hence the location of the window, will depend upon the angle $\beta$ which is the angle to which the camera is shifted between exposures.

In making table top or close-up stereo exposures, an exposure is first made through one lens, say the left lens, Figs. 1 and 2, the right lens being covered. The camera is then tilted through its proper angle so that line $m'$ will intersect line 14 to position the window at the required distance from the camera. After the first exposure is made, the left lens is then covered and the right lens uncovered. The camera is then tilted in the opposite direction through the proper angle, so that the line $n'$ will intersect line 14 at the same point intersected by the line $m'$ so the window will be located at the same point for the two exposures. Various means may be provided for securing the proper tilt of the camera to position the window.

Figure 3:
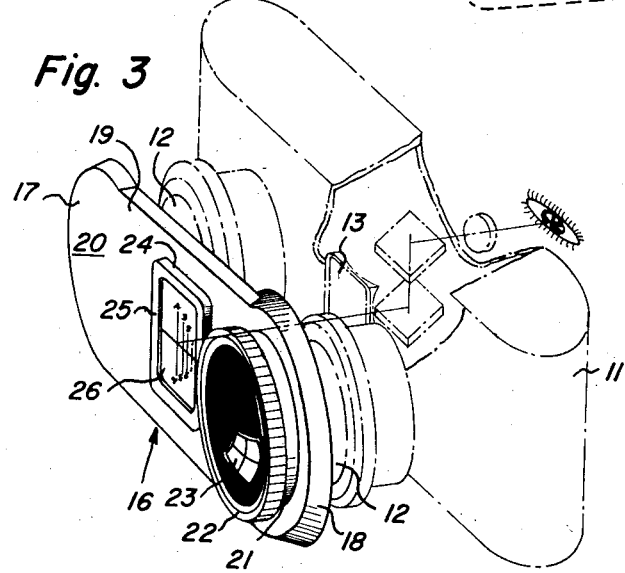
Fig. 3 is a perspective view showing the relation of the close-up attachment of the present invention to a stereo camera.

In order to cover the proper lens and tilt the camera through the required angle, the present invention provides a novel form of close up attachment. This attachment comprises a body portion, broadly designated by the numeral 16 and of the shape shown in Fig. 3. This attachment is provided with substantially circular end portions 17 and 18 which are connected by a cross or tie member 19. The portions 17 and 18 are spaced the same distance as the spacing of the lenses 12 and are positioned in alignment and overlie the lenses, as shown in Fig. 3. The left portion 17 as viewed in Fig. 3, is covered, as shown at 20, by extending the front wall of the member 19. Thus, in the position of the attachment shown in Fig. 3, the section 20 of portion 17 will cover the left lens 11 and will thus prevent the making of an exposure therethrough, as is deemed apparent. However, the right portion 18 of the attachment 16 is formed with a circular aperture 21 which is internally threaded to receive a similarly threaded ring 22 which carries a portrait lens 23. Thus, the lens 23 is positioned in front of and in optical alignment with the right lens 12 of the camera so that an exposure can be made therethrough. After an exposure has been made through the right lens, the attachment is turned end for end so that the cover 17 will now cover the right lens and the portrait lens 13 will be positioned in alignment with the left lens to permit an exposure therethrough. Thus, each exposure is made through only one lens at a time.

In order that each camera lens during exposure will be tilted through the proper angle and in the proper direction to position the window the required distance and at the same location for each exposure, the present invention provides an attachment 16 with a scale or reticle which enables the user to make the necessary adjustments accurately, easily and quickly.

Figure 4:
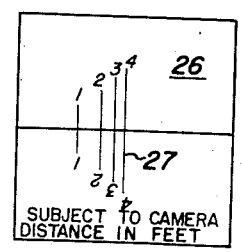
Fig. 4 is a front view of the reticle or focusing scale of the attachment.

To this end, the cross member 19 is formed with an aperture 24 in which is positioned a frame 25 carrying a clear, light-transmitting member or glass plate 26, as clearly illustrated in Fig. 3. This plate 26 has formed thereon in any suitable manner, a distance scale or reticle 27 which indicates the distance of 1 foot to 4 feet. There is no reason to go beyond 4 feet because from 5 feet on the camera works satisfactorily and no attachment is necessary. This scale 27 is offset laterally from line 14 in the direction of the portrait lens 23 so that the scale will be on opposite sides of the line 14 when the exposure is made through different camera lenses. If a 1 foot distance-to-subject is desired, the camera is positioned to locate the 1 foot mark of the scale 27 on the center of the subject. On taking the second exposure, the same procedure is followed. It will be obvious, however, that due to the lateral offset of the scale 27 the 1 foot mark will appear on opposite sides of the center line 14 for the second exposure. To facilitate reading of the scale as the attachment is turned over when positioned over the second lens, the scale 27 has a marking arranged in the manner illustrated in Figs. 3 and 4 so that in either position of the attachment the scale will appear upright, the advantages of which are deemed apparent. As the scale 27 indicates the desired distance of the subject from the camera, the scale is designated as "subject-to-camera" scale, and the scale indicates the desired distance in feet.

By means of this attachment successive stereo exposures can be made with assurance that both lenses will cover exactly the same field so that the window will be positioned accurately for both exposures, as will be apparent to those familiar with stereo photography. The attachment may be snapped over the lenses 12 or may be attached to the camera in any suitable manner so long as the portion 17 covers one lens and the portrait lens 23 is positioned in front of the other lens so as to prevent an exposure through both lenses at the same time. It may prove advantageous to mount the portrait lens 22 with its optical center line displaced inward of but parallel to the optical center line of the camera lens.

In addition to the difficulties of window location, stereo close-ups exhibit enhanced distortion. This is due to two factors: (1) an exaggerated separation of the camera lenses, and (2) the fact that two images are viewed at a distance different than that which the images were taken by the camera. A base shift of ½ inch inward between exposures approximates the proper correction for the majority of individuals.

Figure 5:
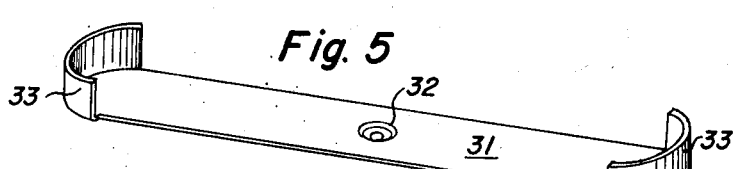
Fig. 5 is a view of the base for use with a stereo camera for correcting distortions of stereo close-ups.
Figure 6:
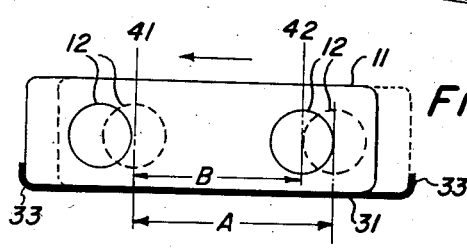
Fig. 6 is a diagrammatic view illustrating the base shift to correct for distortions.

A second device, illustrated in Figs. 5 and 6 and broadly indicated by the numeral 30, may be used in conjunction with the attachment 16 to locate the window and eliminate the distortion effect. This device comprises a base or camera-supporting portion 31. This base has a length which is slightly longer than the camera 11 the latter being shown diagrammatically in Fig. 6. The base 31 is formed with a central opening 32 by which the base 31 may be attached to a tripod or other suitable supporting member, not shown. Also, the opposite ends of the base 31 are formed with curved stops or positioning members 33 which conform more or less to the round ends of the camera.

The device 30 operates as follows: with the camera mount at its extreme right position, as shown in the dotted lines, Fig. 6, the right end of the camera engages and is stopped and positioned by the right positioning member 33 and the lenses 12 will then be in the dotted position. It will be noted from this figure that the lenses have a separation or base distance designated by the letter A. Now, with the lenses in this dotted position an exposure is made through the left lens at position 41, Fig. 6. The camera is then slid or shifted to the left until the left end of the camera engages and is stopped in the position by the left positioning member 33, the camera then to be in the solid line position and the lenses will then be in the full line position. An exposure will then be made through the right lens which is now in the position 42, Fig. 6. As the left exposure was made through the left lens at position 41 and the right exposure was made through the right lens at position 42, the effective base of the lens for exposure is now indicated by the letter B. It will be noted that the base B is shorter than the base A. This difference is sufficient to correct for the above mentioned distortion. The device 30 may be used in connection with attachment 16 to give the desired correction to provide the desired stereo effect between the two images.

Thus, the present invention provides an arrangement for predetermining the window location and the correction of distortion in making stereo exposures. The arrangements are simple, relatively inexpensive to manufacture, easy to use, and highly effective in their results.

While one embodiment of the invention has been disclosed, it is to be understood that the inventive idea may be carried out in a number of ways, therefore, this application is not to be limited to the precise details described, but is intended to cover all modifications and variations thereof falling within the scope of the appended claims.

What I claim and desire to secure by Letters Patent of the United States is:

1. A stereo close-up attachment for use with a stereo camera having a pair of spaced taking lenses and a viewfinder comprising, in combination, a body portion, means for said portion for blocking one of said lenses so that an exposure can be made only through one of said lenses, a portrait lens carried by said portion and positioned in front of the other lens, and scale means arranged in alignment with and viewable through said viewfinder to position the scale in accordance with the subject-to-camera distance.

2. A stereo close-up attachment for use with a stereo camera having a pair of spaced taking lenses and a viewfinder comprising, in combination, a reversible body portion, a blocking element on said portion positionable over one of said lenses so an exposure can be made through only one lens at a time, a portrait lens carried by said portion and positionable in front of the lens through which the exposure is to be made, a light-transmitting plate arranged in optical alignment with and viewable through said viewfinder, and positioning indicia carried by said plate to indicate the subject-to-camera distance.

3. A stereo close-up attachment for use with a stereo camera having a pair of spaced taking lenses and a viewfinder for viewing the image taken by said camera, comprising, in combination, a body portion, sections of said portion positioned in registry with said lenses, a blocking element on one of said sections overlying one of said lenses, a portrait lens carried by the other section and arranged in alignment and cooperating with the other lens so an exposure can be made through only one of said lenses, and a positioning means arranged in alignment and cooperating with said viewfinder to position the axis of the taking lens in relation to the subject-to-camera distance.

4. A stereo close-up attachment for use with a stereo camera having a pair of spaced taking lenses and a viewfinder comprising, in combination, a body portion, means on said portion for blocking one of said lenses so that an exposure can be made only through one of said lenses, a portrait lens carried by said portion and positioned in front of the other lens, and a positioning means arranged in the optical path of said viewfinder to indicate the adjustment of the axis of the taking lens with relation to the subject-to-camera distance, said positioning means being offset laterally from the optical axis of said viewfinder.

5. A stereo close-up attachment for use with a stereo camera having a pair of spaced taking lenses and a viewfinder for viewing the image taken by said camera, comprising, in combination, a body portion, sections of said portion positioned in registry with said lenses, a blocking element on one of said sections overlying one of said lenses, a portrait lens carried by the other section and arranged in alignment and cooperating with the other lens so an exposure can be made through only one of said lenses, a light-transmitting plate on said body portion arranged in front and in optical alignment with said viewfinder, and a subject to camera scale on said plate, said scale being offset laterally from the optical axis of said viewfinder.

6. A stereo close-up attachment for use with a stereo camera having a pair of spaced taking lenses and a viewfinder for viewing the image taken by said camera, comprising, in combination, a body portion, sections of said portion positioned in registry with said lenses, a blocking element on one of said sections overlying one of said lenses, a portrait lens carried by the other section and arranged in alignment and cooperating with the other lens, the body portion being reversible so that an exposure can be made first through one lens only and then through the other lens only, a light-transmitting plate mounted on said body portion in alignment with said viewfinder, and a subject-to-camera scale carried by said plate and offset laterally from the optical axis of the viewfinder in the direction of the taking lens.

References Cited in the file of this patent

UNITED STATES PATENTS

| | | |
|---|---|---|
| 926,912 | Vogt | July 6, 1909 |
| 2,279,443 | Chanosky | Apr. 14, 1942 |
| 2,725,804 | Herzfeld | Dec. 6, 1955 |